Figure 1:
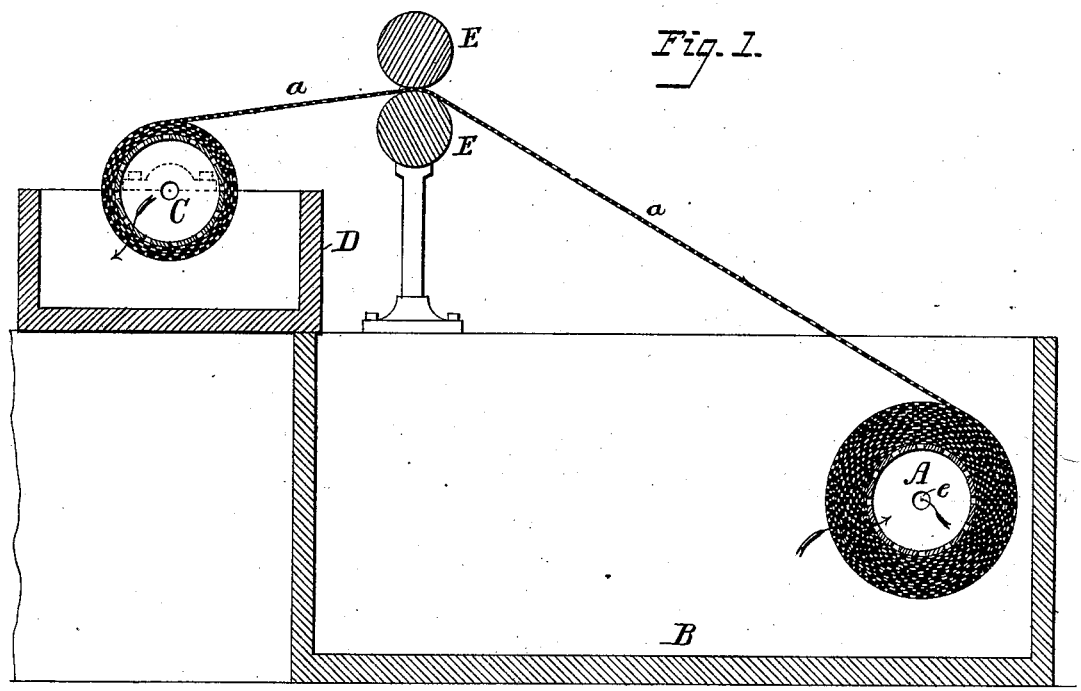

(No Model.)

C. H. SENFF & P. CASAMAJOR.
Filtering Apparatus.

No. 237,134. Patented Feb. 1, 1881.

UNITED STATES PATENT OFFICE.

CHARLES H. SENFF, OF NEW YORK, AND PAUL CASAMAJOR, OF BROOKLYN, N. Y.

FILTERING APPARATUS.

SPECIFICATION forming part of Letters Patent No. 237,134, dated February 1, 1881.

Application filed November 17, 1880. (No model.)

*To all whom it may concern:*

Be it known that we, CHARLES HENRY SENFF, of the city, county, and State of New York, and PAUL CASAMAJOR, of the city of Brooklyn, county of Kings, New York State, have jointly invented certain new Improvements in Filtering Apparatus, of which the following is the specification.

Our invention is a filter in which the filtering medium is maintained at all times in such a free and unobstructed condition that it will work continuously with the desired rapidity and efficiency.

As is well known most of the ordinary forms of filters will work rapidly and well when first put in operation, but as the refuse matter collects upon the surfaces or in the interstices of the filtering media the efficiency of the filter is reduced and finally it becomes inoperative, rendering it necessary to discard it or to temporarily suspend operations while the filter is cleansed.

The object of our invention is to avoid the delays, expense, and other above-recited objections incident to ordinary modes of construction, which object we effect by using superposed sheets or layers of filtering material, and, as the outer sheet or layer becomes obstructed or clogged, removing the same while the filtering is carried on by the remaining layers.

Various modes of construction may be adopted in carrying out our invention. For instance, the sheets of filtering material may be flat and superposed opposite an opening, or at one side of a casing into or out of which the liquid to be filtered is directed in any suitable manner, the outer or inner sheets being successively removed as they become clogged; or the filtering material may be in the form of concentric hollow cylinders, of which the outer or inner cylinders are successively removed as may be necessary; and other constructions will occur to those skilled in the art. We prefer, however, to use a filtering material in one continuous sheet in rolls, as shown in the drawings, in which—

Figure 2:
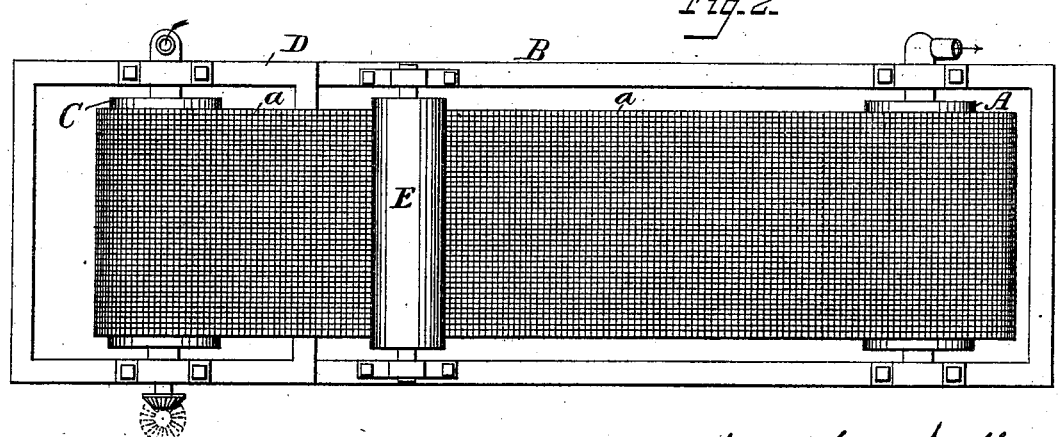

Figure 1 is a sectional elevation of a filter constructed in accordance with our invention, and Fig. 2 is a plan view.

In this case the single sheet of filtering material *a*, of textile fabric, wire-cloth, or other suitable material, is wound upon a perforated case or cylinder, A, closed at the ends, turning in a vat, B, containing the liquid material to be filtered, and provided with a hollow trunnion, *e*, which may be connected with an exhaust-pump or other appliance, whereby the liquid is caused to pass from the vat through the roll of filtering material into the cylinder, and out of the latter to any suitable receptacle. The sheet is gradually or intermittently unwound from the filtering-cylinder, so that as the outer surface of the filter becomes obstructed it is gradually removed, exposing a fresh unobstructed filtering medium, and thereby maintaining the efficiency of the filter.

The filtering-cylinder may be arranged with its axis in a vertical line. We prefer, however, to place it horizontally, and to combine therewith either a second perforated cylinder, C, having closed ends and a hollow trunnion, and turning in a tank, D, or a winding apparatus serving merely as a reel. The filtering-cloth *a* is wound upon this cylinder or reel, as it is unwound from the cylinder A. In case a cylinder, as shown at C, is used, water can be forced into the cylinder C, and outwardly through the meshes of the cloth, or inwardly, by suction or pressure, thereby cleansing the latter after the cloth has passed from the cylinder A. The cloth after being thus treated may be easily removed, and, if necessary, further treated to get rid of remaining impurities.

It will be found advisable, in many instances, to pass the sheet between pressure-rolls E E, whereby any liquid in the deposit or dregs is squeezed out, thereby preventing any loss of the same. In some cases a scraper may be used to remove the dregs.

By the construction shown and described the filtering operation is practically continuous, and the filtering medium may be maintained in its most effective condition.

Instead of a cylinder, the cloth may be wound round a prism with square, octagonal, or other base. Where the filtering material consists of separate sheets square or angular cases are substituted for cylinders A and C, and the superposed sheets are placed upon one or more sides of each case, which sides are open or perforated, and any suitable means for successively removing and replacing the sheets automatically or otherwise may be adopted.

We claim as our invention and desire to secure by Letters Patent—

1. A filter provided with a series of removable superposed sheets or layers of filtering material, arranged, substantially as described, to permit the outer filtering-surface to be renewed by the removal of the outer layers, as set forth.

2. The combination, in a filter, of a case or receptacle for the filtered liquid and superposed layers of filtering material arranged opposite the entrance to said receptacle and successively removable, substantially as set forth.

3. The combination, in a filter, of a perforated case or cylinder communicating with an outlet for the filtered liquid, and a sheet of filtering material wound in layers upon the said case and removable therefrom, substantially as set forth.

4. The combination, in a filter, of the revolving perforated casings in separate vats, and filter-cloth arranged to be wound from one casing to the other as the same are revolved, and means for forcing or exhausting the fluid to be filtered into one casing and for forcing or exhausting water into the other casing, substantially as set forth.

In testimony whereof we have signed our names to this specification in the presence of two subscribing witnesses.

CHARLES HENRY SENFF.
PAUL CASAMAJOR.

Witnesses:
   JOHN E. JAMES,
   JACOB MAIGLER.